United States Patent

[11] 3,543,670

| [72] | Inventor | Richard L. Stone<br>Los Altos Hills, California |
|---|---|---|
| [21] | Appl. No. | 829,892 |
| [22] | Filed | June 3, 1969<br>Continuation-in-part of Ser. No. 739,005,<br>June 21, 1968 |
| [45] | Patented | Dec. 1, 1970 |
| [73] | Assignee | Wallace-Murray Corporation<br>New York, New York<br>a corporation of Delaware |

[54] DEVICE FOR INTERCONNECTING TUBULAR MEMBERS
4 Claims, 5 Drawing Figs.

[52] U.S. Cl. .................................................. 98/122,
98/78; 285/419, 285/424
[51] Int. Cl. ........................................ F23l 17/02;
F16l 21/08
[50] Field of Search ........................................... 285/419,
370, 371, 424; 98/61, 66, 122

[56] References Cited
UNITED STATES PATENTS

| 864,034 | 8/1907 | Rudderow | 285/419X |
|---|---|---|---|
| 2,463,593 | 3/1949 | Boardman | 285/424X |
| 2,985,091 | 5/1961 | Hatcher | 285/424X |

*Primary Examiner*—William E. Wayner
*Attorney*—Owen, Wickersham and Erickson

ABSTRACT: A connector device for attaching sheet metal terminal devices on vent pipes or metal chimneys which can either contract around or expand within the vent or chimney pipe is comprised of a sheet metal sleeve having portions that overlap longitudinally and are pivotally connected at a point between their ends. Spaced from the pivot point near the outlet of the terminal device is a means for applying a substantially tangential force to push apart or bring together the adjacent overlapped end portions, thereby expanding or contracting the circumference of the connector device at the lower end.

Patented Dec. 1, 1970　3,543,670
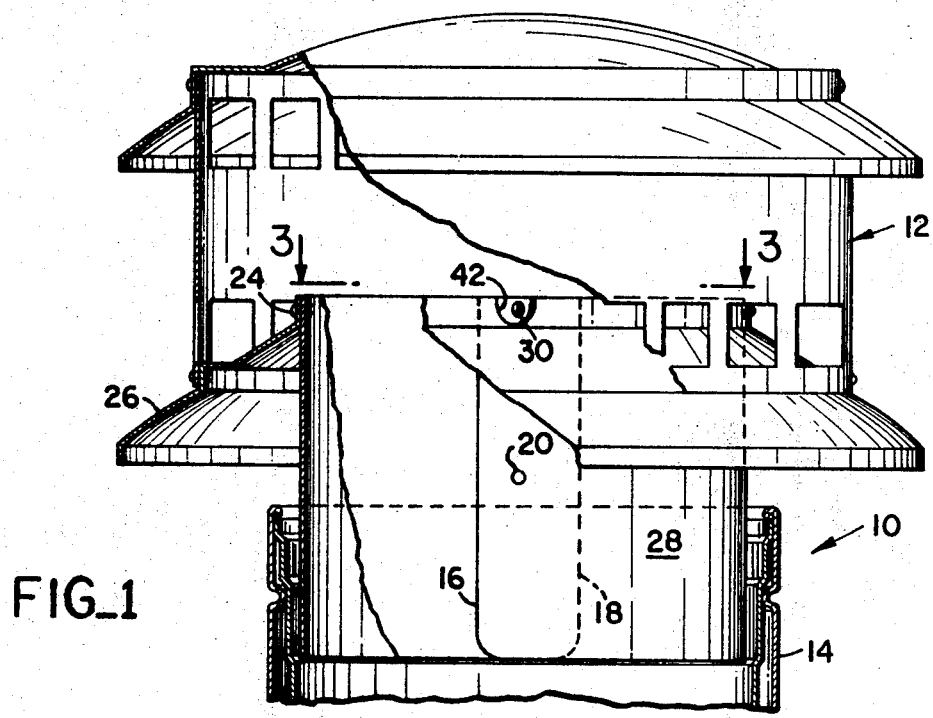
FIG_1
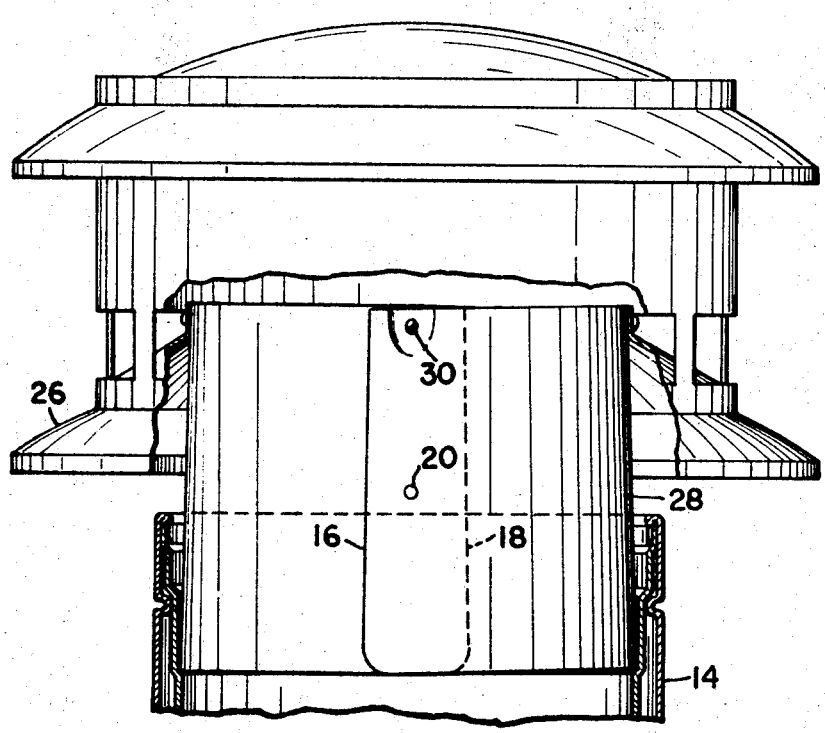
FIG_2
INVENTOR.
RICHARD L. STONE
BY
Owen, Wickersham & Erickson
ATTORNEYS Patented Dec. 1, 1970 3,543,670
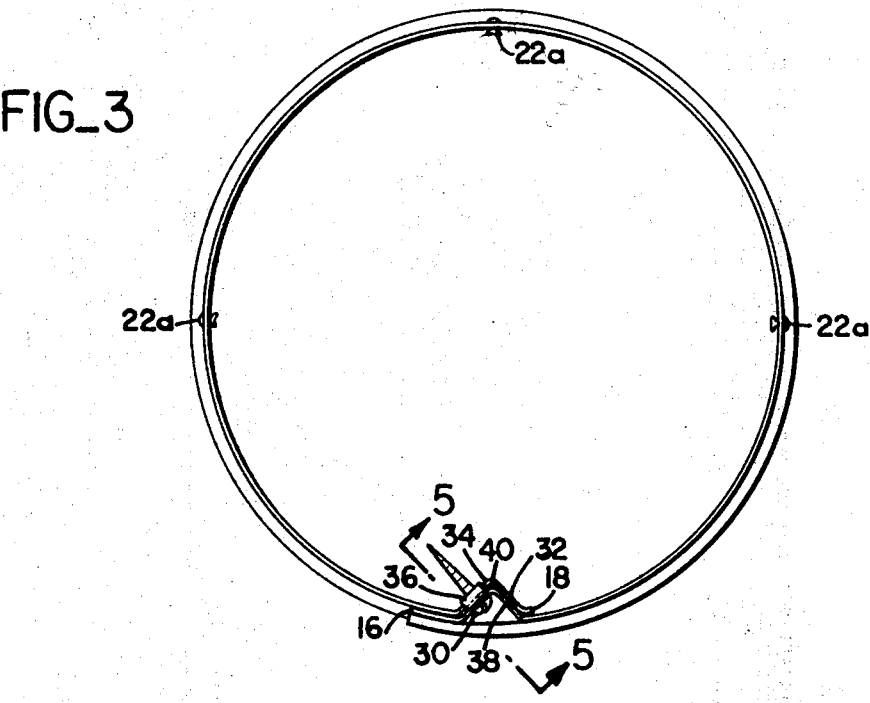
FIG_3
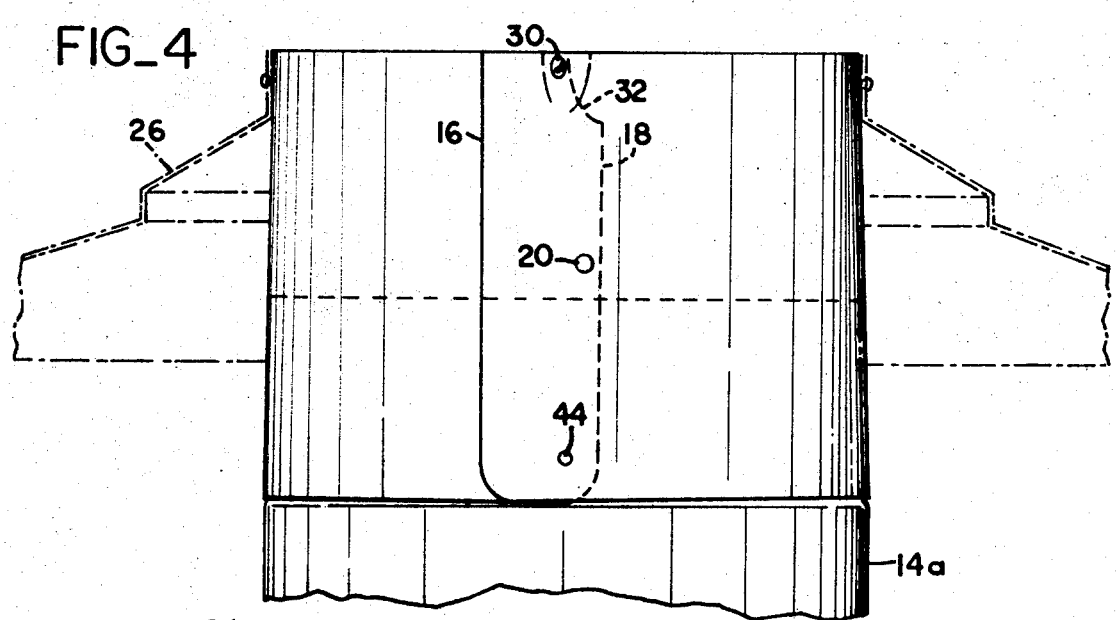
FIG_4
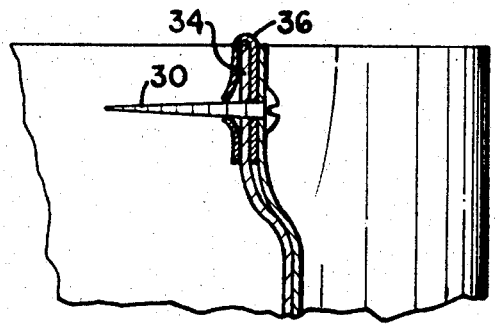
FIG_5
INVENTOR.
RICHARD L. STONE
BY
Owen, Wickersham & Erickson
ATTORNEYS

DEVICE FOR INTERCONNECTING TUBULAR MEMBERS

This application is a continuation-in-part of U.S. Pat. application Ser. No. 739,005 filed June 21, 1968.

This invention relates to a sheet metal connecter device for connecting terminal devices to vent or flue pipe structures. Terminal devices such as vent tops which control the discharge of air and gases from a vent or a chimney pipe to protect it from an influx of rain and foreign material must be firmly secured to the end of the pipe. Heretofore, such connections for sheet metal conduits required relatively complicated and expensive coupling devices to provide the strong durable connection required. A mere tapering, sliding or telescoping union of parts was often unsatisfactory particularly when the part dimensions went together with excessive clearance and failed to provide a snug connection.

A general object of the present invention is to overcome the aforesaid problems and disadvantages with a relatively simple coupling or connecting device that can be quickly and easily installed and which can be easily adjusted to connect terminal devices to pipes of varying size.

More specifically, it is an object of my invention to provide a coupling device for a sheet metal terminal device whose diameter at one end can be expanded to fit tightly within the end of a pipe or contracted to fit together around the end of a pipe.

Another object of the invention is to provide a connecter device for joining terminal devices or vent tops to prefabricated vent and flue pipe sections that is particularly well adapted for ease and economy of manufacture. The present invention contemplates a connecter unit formed from a sheet metal sleeve section of preferably uniform width that is overlapped at its ends longitudinally. At a point along these longitudinally overlapped portions they are pivotally connected together as by a rivet or the like. Spaced from the aforesaid pivot point at the neck of the terminal device is an adjustable means for applying a tangential force that moves one of the overlapping end portions circumferentially with respect to the other said end portion. Thus, the connecter unit may be initially adjusted so that at its outer end its diameter is relatively small thereby easing its insertion in a female pipe member. Once in place, the tangential means may be actuated to enlarge the circumference of the inserted end until it is firmly lodged in the female member. In other instances the lower end may first be expanded to fit around the end of the mating pipe, and thereafter the tangential means may be actuated to cause the lower end to grip the end of the pipe.

Other objects, advantages and features of the invention will become apparent from the following detailed description presented in conjunction with the accompanying drawing, in which:

FIG. 1 is an exploded view in elevation and partially in section showing a connecter device embodying the principles of my invention attached to a typical vent top and positioned to enter a vent pipe;

FIG. 2 is a view in elevation and partially in section showing the top and pipe of FIG. 1 fully connected by my connecter device;

FIG. 3 is a view in section taken along line 3-3 of FIG. 1;

FIG. 4 is a fragmentary view in elevation showing a connecter according to my invention fitted over the end of a pipe in a modified form of installation;

FIG. 5 is an enlarged view in elevation taken along line 5-5 of FIG. 3 showing the tangential force producing means of my connecter With reference to the drawing, FIG. 1 shows a connecter device 10 embodying the principles of the present invention as it appears when attached to a typical top or terminal device 12. The latter is usually installed on a gas vent pipe 14 or sheet metal chimney which extends above the roof level, and its general purpose is to prevent rain and foreign objects from entering the vent pipe or chimney and to provide it with desirable discharge and aspirating characteristics. The top itself can take various forms, and the one shown in merely illustrative and not limiting to the features of my connecter device 10. The connecter 10 is formed from a piece of sheet metal, preferably of uniform width, which overlaps longitudinally at its ends to form overlapped and overlapping portions 16 and 18. The latter are connected together at a point approximately half way between their ends by a pin or rivet 20 which leaves the lower ends of these overlapped portions free to move relative to each other. At a point near its upper end the connecter device is fixed by rivets 22 or some other fastening means to the top 12. In the arrangement shown, the connecter is fixed in the aforesaid manner in an inner cylindrical flange 24 of a lower skirt or deflector 26 of the top 12. However, it may be attached to any suitable portion of the top device depending on whatever configuration the top has, so long as it is firmly fixed thereto in a manner that allows the desired pivoting and relative movement of the connecter components. When so attached, a lower portion 28 of the connecter extends well below and free from the top structure.

At the upper end of the connecter 10 the overlapped portion 16 and 18 are connected together by a screw 30 that can be adjusted to increase or decrease the amount of their overlap. In the embodiment shown, the inside or overlapped connecter portion 18 is cut away at its upper corner along a line 32, and adjacent the top of this cutaway portion is inwardly bent flange 34 which is located above and substantially alined vertically with the pivot pin 20. As shown best in FIG. 5, a reinforcing clip 36 is bent over the end of the flange 34 and both the flange and the clip are provided with alined holes within which the screw 30 is threadedly engaged. The overlapping connecter portion 16 is provided at its upper end with an inwardly extending protuberance 38 having a generally flat bearing portion 40 that is parallel to the flange 34 on the overlapped connecter portion and has a relatively large hole to receive the screw 30.

It is important that the fasteners 22 such as rivets for securing the connecter to the vent top be properly spaced apart circumferentially in order to allow the adjusting screw 30 to provide the necessary movement between the overlapping portions 16 and 18. Considering such factors of the flexibility of the connecter sheet material and the amount of relative movement required between the overlapped portions I have found that the two fasteners 22a and 22b on opposite sides of the screw should be no closer than 90° together. Thus, in the end portion of the connecter containing the screw 30 between these two fasteners, the connecter can flex and the overlapped portions 16 and 18 can slide relative to each other as the screw is tightened. The rest of the connecter portion between the two fasteners on the opposite sides of the connecter from the screw can be secured to the top by additional fasteners or weldments such as the rivet 22c, shown in FIG. 3.

When a vent top 12 with the connecter 10 is to be attached to a vent pipe or chimney, as shown in FIGS. 1 and 2, the adjusting screw 30 is first loosened so that the overlapped portions 16 and 18 at the upper end of the connecter can move to increase the maximum open position. A cutout 42 is provided in the flange 24 of the top to provide access to the screw 30. As this movement occurs, the overlapped portions pivot about the central pin 20, and at the lower end of the connecter its diameter decreases. When the lower end of the connecter is small enough, it can be inserted inside of the vent pipe or metal chimney to which it is to be attached. Now, the screw 30 can be turned to draw the flange 34 and bearing portion 40 and thus the overlapped connecter portions at its upper end closer together. These upper connecter portions slide circumferentially relative to each other and overlap to a greater extent between the fasteners 22a and 22b. This causes a pivoting action around the pin 20, and the overlapped connecter portions at the bottom end of the connecter tend to slide farther apart and thus to increase the circumference of the connecter portion that is within the vent pipe or chimney 14. As soon as the lower end of the connecter expands to the dimensional limits of the vent pipe or chimney it becomes secured tightly therein and remains so until the screw 30 is reversed from its tightening position.

The aforesaid arrangement wherein the connecter operates as an expandable male-type connecter represents the most likely application of my invention. However my connecter may also be utilized as a female-type connecter on single wall crimped end pie. pipe. As shown in FIG. 4, the set screw 30 in this instance is first turned so as to draw the overlapped portions of the connecter at its upper end close enough together to enlarge the lower end sufficiently to fit over the end of the crimped pipe 14a. A downward force is then applied to the vent top to push the connecter 10 down on the crimped pipe a sufficient amount, (e.g., 2 inches or more). Once in place a single hole 44 can be drilled through the lower overlapping portions of the connecter and the crimped pipe to receive a suitable sheet metal fastener.

It will be seen from the foregoing that my connecter device has a remarkable versatility and may be utilized in many different forms to interconnect various sheet metal vent tops to metal flue pipe and outlets to plenums or the like. However, all embodiments of my invention include the combination of a vent top with a sheet metal sleeve that may be cylindrical or tapered having overlapping, longitudinally extending end portions that are pivotally connected at one point, thereby leaving the lower end of the sleeve unconnected and free to move. The substantially tangentially oriented screw 32 can thus be adjusted in position to apply a force spaced longitudinally from the pivot point to expand or contract the circumference at one end of the connecter.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination, a terminal device adapted for installation on a vent pipe or a metal chimney, said device having:
    an inner cylindrical flange;
    a tubular connecter comprising:
    a piece of sheet metal bent to form a tubular sleeve with inner and outer overlapping end portion that extend longitudinally;
    a plurality of circumferentially spaced apart fasteners for fixing the upper end of said connecter to said cylindrical flange at preselected points;
    means for pivotally connecting said overlapping end portions at a point between the upper and lower ends of said connecter; and
    means located at the upper end of said connecter and located circumferentially between two of said fasteners for applying a substantially tangential force tending to pull its said overlapping end portions closer together at the upper end, while simultaneously causing said overlapping portions at the lower end to decrease their amount of overlap, and thereby increase the circumference of said sleeve at its lower end.

2. The combination as described in claim 1 wherein said means for applying a force comprises a screw extending through one overlapping end portion and threadedly engaged in the adjacent overlapped end portion.

3. The combination as described in claim 1 including means at the upper end of said inner overlapping end portion forming an inwardly extending flange and means at the upper end of said outer overlapping end portion forming a bearing member substantially parallel to said flange, and a screw extending through said bearing member and threadedly engaged with said flange.

4. The combination as described in claim 1 wherein said means for fixing said connecter to said cylindrical flange of said terminal device comprises at least three of said spaced apart fasteners with the fasteners on opposite sides of said means for applying a force being separated by at least 90° of arc of said cylindrical flange.